Dec. 7, 1926.
F. F. SMALL ET AL
1,609,782
CONTROL MECHANISM FOR VARIABLE SPEED GEARING
Filed Jan. 23, 1926
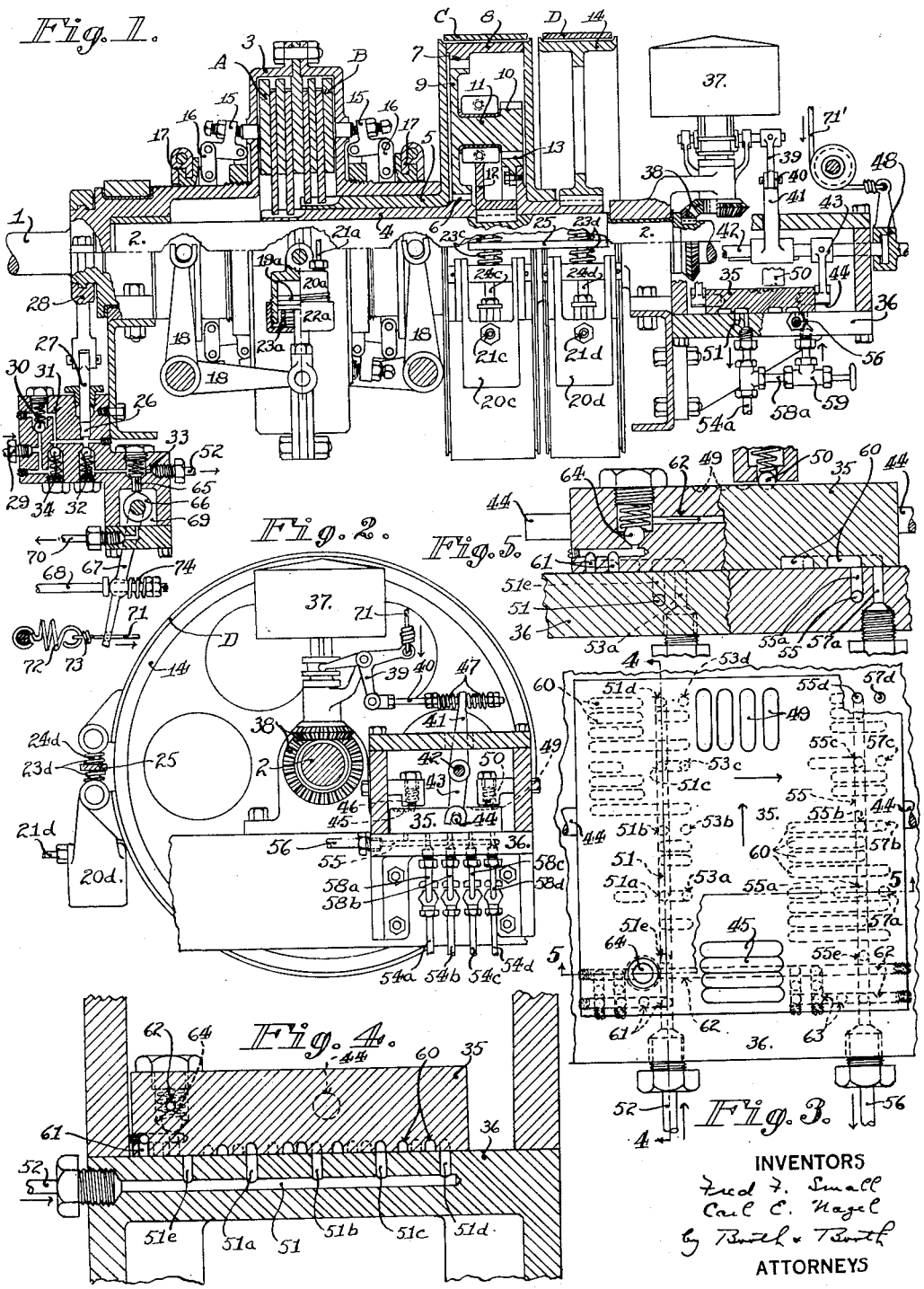
INVENTORS
Fred F. Small
Carl C. Nagel
by Booth & Booth
ATTORNEYS Patented Dec. 7, 1926.

1,609,782

UNITED STATES PATENT OFFICE.

FRED F. SMALL, OF SAN FRANCISCO, AND CARL E. NAGEL, OF OAKLAND, CALIFORNIA.

CONTROL MECHANISM FOR VARIABLE-SPEED GEARING.

REISSUED
MAR 26 1940

Application filed January 23, 1926. Serial No. 83,241.

Our invention relates to mechanism for controlling the operation of variable speed gearing or power-transmitting devices of the type in which any one of a plurality of speed ratios between a driving and a driven member may be established.

The principal object of our invention is to provide such a control mechanism which is automatically actuated according to the speed of the driven member, so that, as the speed of said member increases or decreases, the speed ratio between it and the driving member is automatically changed. Another object of the invention is to provide means for manually controlling the mechanism in such a manner that its automatic operation will produce various results. A still further object is to provide means for automatically preventing excessive speed of the driven member. Other objects and advantages of the invention will be apparent from the following description, which should be read with the understanding that the form, proportion, operation and arrangement of the several parts may be varied, within the limits of the claims hereto appended, without departing from the spirit of the invention as set forth in said claims.

Our invention is particularly adapted, but not limited, to use in controlling the variable speed gearing of motor driven vehicles, such as trucks, busses, rail-cars and the like. In such vehicles it is desirable, in the interest of safety, to relieve the operator or driver of as many operations as possible, in order to permit him to concentrate his attention on the road or track in front of him. And for the same reason it is also desirable to limit the discretionary acts of the driver, as for example by the automatic prevention of excessive speed.

When used in connection with such motor driven vehicles, our control mechanism relieves the driver of the usual operation of gear-shifting, and under certain conditions automatically applies the brakes, so that he cannot lose control of his vehicle, or injure its mechanism by careless operation.

Our invention will be hereinafter described, and is herewith illustrated, as applied to a variable speed planetary-gear power transmitting mechanism of the type forming the subject matter of our application for United States Letters Patent, Serial Number 756,210, filed December 16, 1924, but it is to be understood that it may be applied without material change to other forms of variable speed power transmitting mechanism. Moreover, our invention is described and illustrated as embodied in a fluid actuated mechanism, but it is to be understood that other actuating means may be used, such for example as electrically or magnetically operated devices, without change in the underlying principles of the invention.

With this in view, a preferred embodiment of our invention will now be fully described with reference to the accompanying drawings, wherein—

Fig. 1 is a part sectional longitudinal view of a variable speed gear device having our control mechanism associated therewith.

Fig. 2 is a part sectional end elevation thereof, as viewed from the right of Fig. 1.

Fig. 3 is a plan view, enlarged, of the controlling or distributing valve.

Figs. 4 and 5 are sections taken in the direction of the arrows on the respective lines 4—4 and 5—5 of Fig. 3.

In view of the fact that the variable speed gear mechanism shown in Figs. 1 and 2 is that disclosed in our above mentioned application—Serial Number 756,210, it will be described herein only to an extent necessary to an understanding of the application and scope of the present invention. Suffice it to say, therefore, that 1, Fig. 1, is a driving shaft, and 2 is a driven shaft axially aligned therewith. The drive shaft 1 carries a clutch housing 3, within which are two clutches, designated A and B respectively, and said clutches are adapted to connect said drive shaft with the respective sleeves 4 and 5. The sleeve 4 carries a sun pinion 6, and the sleeve 5 carries an internal gear 7, concentric with said sun pinion, and also a drum 8 upon which operates a brake designated by the letter C. The sun pinion 6 and the internal gear 7 both mesh with a planet pinion 9, which has, with a planet pinion 10, a common hub or shaft 11, and said shaft is rotatably carried in a spider 12 secured upon the driven shaft 2. The planet pinion 10 meshes with a sun pinion 13, to which is secured a drum 14, and said drum is provided with a brake designated by the letter D.

The clutches A and B are operated by similar mechanism comprising adjustable dogs 15, toggle links 16, thrust rings 17, and forked bell-crank levers 18. The adjustment of the dogs 15 is preferably such that, when the clutches are fully engaged, as shown, the toggle links 16 are on center, so that there is no end thrust, and consequently very little wear, upon the rings 17. The bell-crank of the clutch A is operated by a piston 19ª working in a fluid pressure cylinder 20ª. A fluid connection 21ª is provided for conducting the fluid to and from said cylinder. This cylinder 20ª is provided with an adjustable cap or head 22ª, and a spring 23ª is interposed between said cap and the piston 19ª for the purpose of releasing the clutch A when the pressure in the cylinder 20ª is relieved. The bell crank of the clutch B is operated by a similar cylinder, not shown, on the other side of the clutch housing.

The brakes C and D are operated by respective cylinders 20ᶜ and 20ᵈ, provided with fluid connections 21ᶜ and 21ᵈ, and with pistons, not shown, which operate rods 24ᶜ and 24ᵈ. These rods are connected with the upper ends of their respective brake bands, and the cylinders themselves are connected with the lower ends of said bands. Springs 23ᶜ and 23ᵈ are provided for releasing the bands, and a fixed anchor plate 25 serves as a mounting for both brake mechanisms. Fig. 2 illustrates the arrangement of the brake D, the brake C being similar.

The above described mechanism, which should be considered merely as typical of any suitable variable-speed power-transmitting device, provides four different speed ratios between the driving shaft 1 and the driven shaft 2. Three of these are forward speeds and one reverse. Thus with clutch A and brake C engaged, and clutch B and brake D released, the lowest forward speed is obtained; with clutch B and brake D engaged, and clutch A and brake C released a slightly higher or intermediate forward speed; with both clutches A and B engaged and both brakes C and D released, the "high" or direct drive; and with clutch A and brake D engaged and clutch B and brake C released, a reverse rotation of the driven shaft 2 or reverse "speed" is obtained. Obviously, with both clutches and both brakes released, no power is transmitted (the so-called neutral position), and with both brakes engaged, a braking effect is exerted upon the driven shaft 2. These various speed combinations are described in detail in our above mentioned application—Serial Number 756,210, and are, accordingly, merely enumerated herein to make clear the operation of the control mechanism hereinafter described.

The fluid for operating the several clutch and brake cylinders may be supplied from any suitable source, but we prefer to provide a pump operated by the driving shaft 1. Such a pump is shown in Fig. 1, and comprises a cylinder 26 in which operates a plunger 27, actuated by an eccentric 28 from the shaft 1. The fluid enters at 29 from any suitable source not shown, and passes through an inlet check valve 30 and a passage 31 to the cylinder 26, from which it is forced out through an outlet check valve 32 and an outlet connection 33. A spring-loaded relief valve 34 is provided for by-passing excess fluid back to the inlet connection 29 to maintain a constant predetermined pressure in the operating cylinders. The supplying of the actuating fluid by a pump operated by the driving shaft is of great advantage in that the speed of operation of the control mechanism is roughly proportional to the speed of said shaft.

Assuming the device to be used in a vehicle driven by an internal combustion engine, there is practically no danger of stalling the engine, because, when the engine is idling slowly, it will take an appreciable time for the pump to build up sufficient pressure to cause the complete engagement of the clutches and brakes, thus giving the operator (or the engine governor, if such be employed) time to increase the throttle opening; but if the engine is running rapidly, the clutches and brakes take hold almost immediately, so that no time is lost in changing gears under load.

In this connection it should be remarked that we prefer to make the clutch release springs, one of which is shown at 23ª in Fig. 1, weaker than the brake release springs 23ᶜ and 23ᵈ, so that the clutches will be engaged before and released after the brakes. The brake bands, which are more accessible and easier to reline or replace, are thus made to take up and release the load, thereby preventing wear on the friction surfaces of the clutches. The clutch cylinder caps, one of which is shown at 22ª, are adjustable endwise of their cylinders, so that they form stops to limit the movement of the clutch operating mechanism, the springs, when fully compressed, forming, in effect, spacers between the pistons and said caps. By properly setting said caps and the adjustment of the dogs 15, the clutches may be set to carry only the normal load, and will slip under conditions of excessive load, thereby preventing injury to the power transmitting mechanism.

The control of the fluid issuing from the pump outlet 33, and its proper distribution to the various clutch and brake operating cylinders, is effected by a single distributing valve, which, in its best form, comprises a flat plate 35, Figs. 1 and 2, adapted to slide upon a flat fixed seat 36. The valve is capable of movement over its seat in two directions perpendicular to each other; it is moved in one direction, automatically, by devices responsive to the speed of the driven shaft 2, and in the other by manually operated or other means under the control of the operator.

The automatic valve operating device may be of any suitable type. We have indicated, in Figs. 1 and 2, a conventional governor 37 driven from the shaft 2 by bevel gears 38. This governor operates a bell-crank lever 39, a link 40, an arm 41 loosely keyed upon a shaft 42, and depending arms 43 secured to said shaft and forked to engage pins 44 projecting from the sides of the valve 35. The upper surface of the valve is provided with a series of parallel grooves 45, Figs. 2 and 3, adapted to be engaged by a spring-pressed plunger or keeper 46, to locate the valve in its various positions. The connection 47 between the link 40 and the arm 41 is a yieldable one, as shown, to cause the valve to jump suddenly between its various positions. This prevents "hunting" by causing the valve to lag until the speed of the governor builds up or falls sufficiently to snap it into its next position.

The manual or voluntary control of the valve 35 is effected by sliding the shaft 42 end-wise. For this purpose a suitable member 48, Fig. 1, is shown as rotatably connected with the end of said shaft, and is understood to be connected, in any desired manner, with a suitable operating handle, not shown, under the control of the driver or operator. The upper surface of the valve is provided with a series of parallel grooves 49, Figs. 1, 2, 3 and 5, positioned at right angles to the grooves 45, and adapted to be engaged by a spring-pressed keeper 50, Figs. 2 and 5, to locate said valve in its various manual positions. Obviously, the two movements of the valve are independent. Assuming, for example, four positions in each movement, as shown, the governor 37 can shift the valve to any one of its four automatic positions, no matter which manual position it may be in, and, conversely, it can be shifted manually into any one of its four manual positions, no matter which automatic position it may be in.

The seat 36 is provided near one side with a longitudinal passage 51, Figs. 3, 4 and 5, to which fluid is supplied by a pipe 52, Figs. 3 and 4, understood to lead from the pump outlet 33 of Fig. 1. From said passage 51 five ports, 51ª, 51ᵇ, 51ᶜ, 51ᵈ and 51ᵉ, open upon the surface of the seat, as shown in Figs. 3 and 4. Laterally adjacent to the first four of said ports are similar ports 53ª, 53ᵇ, 53ᶜ, and 53ᵈ, Figs. 3 and 5, which extend vertically through the seat, and communicate with pipes 54ª, 54ᵇ, 54ᶜ and 54ᵈ, Figs. 1 and 2. These pipes are understood to lead respectively to the clutch cylinder 20ª, the corresponding cylinder, not shown, for the clutch B, and the brake cylinders 20ᶜ and 20ᵈ. Near the other side of the seat is a longitudinal passage 55, Figs. 3 and 5, from which a pipe 56 leads back to the source of fluid, not shown, from which the pump is supplied. This passage is likewise provided with ports 55ª, 55ᵇ, 55ᶜ, 55ᵈ, and 55ᵉ, and laterally adjacent to the first four of these are ports 57ª, 57ᵇ, 57ᶜ, and 57ᵈ, which are connected by pipes 58ª, 58ᵇ, 58ᶜ and 58ᵈ, Figs. 1 and 2, with the respective pipes 54ª, 54ᵇ, 54ᶜ and 54ᵈ leading to the clutch and brake operating cylinders. The 58 series of connections are preferably provided with controllable regulating valves, one of which is shown at 59 in Fig. 1, for a purpose to be described hereinafter.

The lower surface of the valve 35 is provided with a plurality of parallel laterally disposed grooves 60, Figs. 3, 4 and 5. The lengths and positions of these grooves, as shown in dotted lines in Fig. 3, are such that communication is established, in various combinative relations according to the position of the valve, between the 51 series of ports and the 53 series, and between the 55 series and the 57 series. For example, with the valve in the position shown in Fig. 3, communication is established between ports 51ª and 53ª, between ports 51ᶜ and 53ᶜ, between 55ᵇ and 57ᵇ, and between 55ᵈ and 57ᵈ, the groove establishing communication between the two last mentioned ports being broken away to show a portion of the seat in plan. As a result, fluid entering the seat passage 51 under pressure is distributed through ports 51ª, 53ª, 51ᶜ, 53ᶜ, and pipes 54ª and 54ᶜ to the operating cylinders 20ª of the clutch A and 20ᶜ of the brake C. The clutch A and the brake C are thereby engaged. At the same time, fluid escapes into the discharge passage 55 through ports 55ᵇ, 57ᵇ, 55ᵈ, 57ᵈ, and pipes 58ᵇ, 54ᵇ, 58ᵈ and 54ᵈ, from the operating cylinder (not shown) of the clutch B and from the operating cylinder 20ᵈ of the brake D. The clutch B and the brake D are thereupon released by their respective springs. This combination gives the low speed forward position previously described.

Assuming the manual control means to remain in the same position, as shown, a certain predetermined increase in speed of the driven shaft 2 will cause the governor 37 to shift the valve 35 one notch upwardly as viewed in Fig. 3, which will establish communication between ports 51ᵇ and 53ᵇ, between 51ᵈ and 53ᵈ, between 55ª and 57ª, and between 55ᶜ and 57ᶜ, thereby engaging the clutch B and the brake D, and releasing clutch A and brake C, and thus giving the intermediate forward speed. A further predetermined increase in speed of the driven shaft 2 will cause the governor 37 to shift the valve 35 another notch in the same direction, thereby causing the engagement of both clutches A and B and the release of both brakes C and D, establishing the high speed forward or direct drive. It is thought unnecessary to describe in detail the relations of the valve grooves and seat ports in this position, since these can be seen from a study of Fig. 3. Thus without any manual act whatever, the increasing speed of the driven shaft 2 has shifted the gears from low through intermediate to high. Obviously, decreasing the speed of the drive shaft, such as might be caused by climbing a grade or any other increasing load, will shift the gears in the reverse sequence back to low.

After the high speed position is reached, a further increase of speed of the driven shaft 2 will cause the governor to shift the valve to its fourth and last position, which may be termed for convenience, the excessive speed position. In this valve position, both brakes C and D are engaged, and both clutches A and B released, thereby imposing a braking effect upon the driven shaft 2 and reducing its speed sufficiently to cause the valve to be shifted back to its third or high speed position. Thus there is provided an automatic control to prevent excessive speed of the driven shaft.

As described above, the valve 35 may be shifted sideways, manually, to any one of four positions. It is shown in Fig. 3 in its extreme left-hand, or "forward speed" position, in which its endwise automatic movement, by the governor, produces the described three forward and excessive speed control combinations. Shifting the valve manually one notch toward the right has no effect on the excessive speed combination, but in the other three automatic positions of the valve, i. e. at all governor speeds below the excessive speed, all clutches and brakes are released. This manual position of the valve may be termed its "neutral" position, and is employed, in the case of a vehicle, when standing with the engine idling or when coasting.

Moving the valve manually another notch toward the right brings it to its "reverse" position, in which the lowest governor speed, i. e. the first automatic position of the valve, corresponding to the low speed forward position, causes the clutch A and the brake D to be engaged, and the clutch B and the brake C to be released, thereby establishing the reverse drive. All governor speeds in excess of this, i. e. the other three automatic positions of the valve, produce the same result as the excessive speed position described above, viz. both brakes engaged and both clutches released. Thus the gearing can be reversed only when the vehicle is standing or moving at low speed, and the vehicle can be backed only at a low speed.

In the fourth and last manual position of the valve, which may be termed the "braking position", all its automatic positions cause both brakes to be engaged and both clutches to be released. Thus by moving the manual control device to this "braking position", the brakes are set irrespective of the speed of the driven shaft.

In order to prevent too sudden and powerful application of the brakes C and D, when both are set together for the purpose of braking the driven shaft, we prefer to provide for means for partially relieving the pressure of the operating fluid under such conditions. This is desirable, because the brakes must engage their drums with sufficient force, in the various driving combinations, to hold said drums stationary, but when used for braking the driven shaft, such force is not only not necessary, but might be injurious to the driving mechanism.

As a preferred means for accomplishing this object, we have provided the valve 35 with a series of ports 61, Figs. 3, 4 and 5, adapted to register, in certain valve positions, with the seat port 51$^e$ leading from the pressure fluid passage 51. The valve ports 61 all communicate with a passage 62 extending laterally through the body of the valve, and terminating in a series of ports 63 adapted to register with the seat exhaust port 55$^e$. A spring-loaded relief valve 64 is provided in said passage 62. The ports 61 and 63 are so positioned that they register with pressure and exhaust ports 51$^e$ and 55$^e$ in all positions of the valve in which both brakes are engaged, except in the low speed brake position, i. e. they register in all excessive speed positions, and in all high and intermediate speed positions except "neutral" and "forward". As a result, a by-pass is established for the pressure fluid, through the ports 61, the relief valve 64, the passage 62, and the ports 63. The relief valve 64 is adjusted to open at a lower pressure than the pump relief valve 34, so that the pressure applied to the brake operating cylinders is less, when said by-pass functions, than it is under normal conditions.

The by-pass functions in all braking positions except the low speed, because when traveling in low speed, the full resistance of the brake is not only not injurious, but may be required to stop the vehicle quickly.

The function of the regulating valves 59, one of which is shown in Fig. 1, is to prevent total dropping of the load, momentarily, when shifting from one speed combination to another, with consequent racing of the engine. If these valves were not employed, the fluid would, when the distributing valve 35 is shifted, escape from those cylinders connected with the exhaust or return line more rapidly than the pump could build up the pressure in the cylinders connected with the pressure line. Consequently there would be an interval of time, especially if the driving shaft and the pump were operating slowly, during which all brakes and clutches would be released, the engine would tend to race, and the consequent sudden building up of the fluid pressure would cause the load to be picked up again, in the next speed combination, with a jerk. But by properly regulating the valves 59, the escape of fluid from the released cylinders can be slowed down so that the brakes or clutches operated thereby will not release fully until the other brakes or clutches have begun to pick up the load. Therefore, the transition from one speed combination to the next is made smoothly, without jerk and without racing of the engine. The valves 59, when once properly regulated, remain so indefinitely.

It will be seen from the foregoing, that the driver (assuming the mechanism to be used in an engine driven car or vehicle) can control the variable speed gearing by setting the distributing valve 35 manually in any one of four positions, viz., "neutral", "forward", "reverse" and "braking"; and in each of these the gearing is automatically controlled and operated by the speed of the car. Thus in the neutral manual position, no power is transmitted from the engine to the driving wheels at any speed, but at excessive car speeds, the brakes are automatically applied, (with reduced fluid pressure, due to the functioning of the by-pass described above); in the forward manual position, the gearing is automatically shifted from low through intermediate to high, and back again, as the car speed increases and decreases, and at excessive car speeds the brakes are automatically applied (with reduced pressure); in the reverse manual position, the gearing is automatically placed in "reverse" at low car speeds, and at all higher car speeds the brakes are automatically applied (with reduced pressure); and in the manual braking position, the brakes are automatically applied, with full pressure at low car speeds and with reduced pressure at all higher car speeds.

In order further to relieve the driver of the necessity of manually shifting his control means between neutral and forward positions when making frequent stops, we prefer to provide means for automatically accomplishing the same result. A variety of such means may be employed, and will readily suggest themselves to those skilled in the art, but as an example of a simple and easily applied device, we have shown means for automatically relieving and restoring the pressure in the fluid line leading from the pump to the distributing valve under certain conditions, as for example when the engine throttle is closed to its idling position and again opened to a running position. Obviously, the connection with the engine throttle is merely an example, and accordingly the throttle itself has been omitted from the drawing. The principle involved, however, is that the fluid pressure is automatically relieved and restored by the operation of any convenient member, and it will assist in understanding the advantages and operation of such principle to assume that the operating member is connected or operated in unison with the throttle. Thus, when starting, for example, the operator first throws his manual valve shifting control to "forward", but as long as the engine is idling, with the throttle closed, or more properly, nearly closed, no effect is produced on the gear shifting mechanism, because the pressure of the actuating fluid is automatically relieved. The single act of opening the throttle, however, at once restores the pressure of the actuating fluid, so that the gear shifting mechanism can function as previously described. And conversely, the closing of the throttle again to idling position automatically results in shifting the gearing to "neutral", by relieving the fluid pressure. Therefore, the entire control of the vehicle, exclusive of the brakes and reverse, is effected solely by opening or closing the engine throttle.

For the above purpose we have shown, in Fig. 1, a relief valve 65 in the fluid outlet of the pump, opened by a cam 66 which is oscillated by a lever 67. A rod or drag-link 68 connects said lever with the desired control member, not shown, which has been assumed to be the engine throttle. The connection is so arranged that, when the throttle is in closed or idling position, the cam 66 holds the valve 65 open, allowing the fluid to by-pass through the cam housing 69 and a pipe 70 back to the source of supply (not shown), and thereby relieving the pressure in the line leading to the distributing valve and thence to the various clutch and brake operating cylinders, so that the clutches and brakes are all released by their respective springs; in short, the gearing is thrown into "neutral". But when the throttle is in any other position, the valve 65 is closed, and the fluid pressure is restored, thereby rendering the gear shifting mechanism effective.

We also provide suitable means for preventing abuse of the feature last described. Obviously, the relieving of the pressure of the actuating fluid, if not controlled, would prevent operation of the otherwise automatic braking feature of the mechanism, so that the vehicle might be coasted down hill, for example, at excessive speed, without having the brakes automatically applied. As a convenient and simple means for preventing such abuse, we have shown a flexible wire 71, Figs. 1 and 2, which is understood to connect the cam operating arm 67 with the bell-crank 39 of the governor 37, and which is so arranged that when the car speed becomes excessive, the action of the governor pulls the wire 71 against the resistance of a light spring 72, and draws a stop lug 73 (formed by a twist of said wire) against the arm 67, thereby moving said arm and the cam 66 sufficiently to close the relief valve 65 and restore the fluid pressure to the line. A spring 74 permits the arm 67 to move independently of the link 68.

As a further extension of this feature, a second wire connection 71', Fig. 1, extends from the manual valve shifting member 48 and is understood to be connected with the wire 71 in such a manner that, when the valve 35 is shifted into either of its two last or right hand positions, viz, "reverse" or "brake", the wires 71' and 71 actuate the arm 67 to close the relief valve 65 in the manner and with the result described above. The effect of this is that the automatic pressure relieving feature is entirely inoperative, and the normal operation of the distributing valve and the gear shifting and braking mechanism is therefore fully operative, not only at excessive car speeds, but also when the manual control is thrown into either "reverse" or "braking" position.

We claim:—

1. The combination with a driving member, a driven member, a variable-speed power-transmitting mechanism connecting said members, of fluid actuated means for operating said mechanism to vary the speed ratio between said members, means for supplying fluid under pressure to said operating means, means responsive to the speed of the driven member for automatically controlling said fluid, a movable member, and means actuated by the last mentioned member for relieving the pressure of said fluid.

2. The combination with a driving member, a driven member, a variable-speed power-transmitting mechanism connecting said members, of fluid actuated means for operating said mechanism to vary the speed ratio between said members, means for supplying fluid under pressure to said operating means, means responsive to the speed of one of said members for automatically controlling said fluid, a movable member, means actuated by the last mentioned member for relieving the pressure of said fluid, and means actuated by said speed-responsive controlling means for rendering said pressure-relieving means inoperative.

3. The combination with a driving member, a driven member, a variable-speed power-transmitting mechanism connecting said members, of fluid actuated means for operating said mechanism to vary the speed ratio between said members, means for supplying fluid under pressure to said operating means, manually operated means for controlling said fluid, a movable member, means actuated by the last mentioned member for relieving the pressure of said fluid, and means actuated by said manual controlling means for rendering said pressure-relieving means inoperative.

4. The combination with a driving member, a driven member, and variable-speed power-transmitting mechanism connecting said members, said mechanism including means for applying a braking effect to the driven member, of means responsive to the speed of one of said members for operating said power-transmitting mechanism to vary the speed ratio between said members and for applying said braking effect.

5. The combination with a driving member, a driven member, a variable-speed power-transmitting mechanism connecting said members, of fluid actuated means for operating said mechanism to vary the speed ratio between said members; a fluid controlling valve; means responsive to the speed of one of said members for moving said valve automatically to control said operating means; and means for moving said valve, at will, independently of its automatic movement, to modify its control of said operating means.

6. The combination with a driving member, a driven member, a variable-speed power-transmitting mechanism connecting said members, of fluid actuated means for operating said mechanism to vary the speed ratio between said members; a fluid controlling valve; means responsive to the speed of one of said members for moving said valve automatically in one direction to control said operating means; and means for moving said valve in another direction, at will, to modify its control of said operating means.

7. The combination with a driving member, a driven member, a variable-speed power-transmitting mechanism connecting said members, of fluid actuated means for operating said mechanism to vary the speed ratio between said members, a valve seat member having a plurality of ports; a ported valve cooperating with said seat for controlling the fluid and the operating means actuated thereby, said valve being movable over said seat in a plurality of parallel paths and to a plurality of positions in each path; means responsive to the speed of one of said members for moving said valve along any of said paths for effecting the control of said operating means; and means for shifting said valve to any of said paths to modify such control.

8. The combination with a driving member, a driven member, a variable-speed power-transmitting mechanism connecting said members, of a plurality of fluid actuated means for operating said mechanism to vary the speed ratio between said members; means for supplying fluid; a valve for distributing the fluid to said operating means in various combinations; means responsive to the speed of one of said members for automatically moving said valve to produce certain combinations; and means for moving said valve, at will, to produce other combinations.

9. The combination with a driving member, a driven member, a variable-speed power-transmitting mechanism connecting said members, of a plurality of fluid actuated means for operating said mechanism to vary the speed ratio between said members; means for supplying fluid; a valve for distributing the fluid to said operating means in various combinations; means responsive to the speed of one of said members for automatically moving said valve to produce certain combinations; and means for modifying, at will, the automatic movement of said valve to produce other combinations.

10. The combination with a driving member, a driven member, variable-speed power-transmitting mechanism connecting said members, and a braking means associated therewith, of a plurality of fluid actuated means for operating said mechanism to vary the speed ratio between said members and for operating said braking means; means for supplying fluid; a valve for distributing the fluid to said operating means in various combinations; means responsive to the speed of one of said members for automatically moving said valve to produce certain combinations; and means for moving said valve, at will, to produce other combinations.

11. In combination with a driving member, a driven member and a variable-speed power-transmitting mechanism connecting said members, said mechanism including means for applying a braking effect to said driven member; of means responsive to the speed of the driven member for automatically controlling said mechanism to vary the speed ratio between said members and to apply said braking effect; and means for controlling said mechanism, at will, to apply said braking effect.

12. In combination with a driving member, a driven member and a variable-speed power-transmitting mechanism connecting said members, said mechanism including means for applying a braking effect to said driven member; of fluid pressure actuated means for controlling said mechanism to vary the speed ratio between said members and to apply said braking effect; and means for supplying fluid to said operating means under relatively high pressure to cause the speed-ratio-control effect of said mechanism and under relatively low pressure to cause the braking effect thereof.

13. The combination with a driving member, a driven member, and variable-speed power-transmitting mechanism connecting said members, said mechanism including means for applying a braking effect to the driven member; of means for operating said power-transmitting mechanism to vary the speed ratio between said members; and means responsive to the speed of the driven member for applying said braking effect.

14. The combination with a driving member, a driven member, and variable-speed power-transmitting mechanism connecting said members, said mechanism including means for applying a braking effect to the driven member; of fluid actuated means for operating said power-transmitting mechanism to vary the speed ratio between said members and to apply said braking effect; and means responsive to the speed of one of said members for varying the pressure of the fluid supplied to the means applying said braking effect.

15. The combination with a driving member, a driven member, and a variable-speed power-transmitting mechanism connecting said members, of a plurality of fluid actuated means for operating said mechanism to vary the speed ratio between said members; means for supplying fluid; means responsive to the speed of one of said members for distributing the fluid to said operating means in various combinations; and means for controlling said distributing means, at will, to vary said combinations.

16. The combination with a driving member, a driven member, and a variable-speed power-transmitting mechanism connecting said members, of means for operating said mechanism to vary the speed ratio between said members; a movable controlling device; means responsive to the speed of one of said members for moving said device automatically to control said operating means; and means for moving said device, at will, independently of its automatic movement, to modify its control of said operating means.

17. The combination with a driving member, a driven member, and a variable-speed power-transmitting mechanism connecting said members, of means for operating said mechanism to vary the speed ratio between said members; a controlling device movable in two directions; means responsive to the speed of one of said members for moving said device automatically in one direction to control said operating means; and means for moving said device in the other direction, independently of its automatic movement, to modify its control of said operating means.

18. The combination with a driving member, a driven member, and a variable-speed power-transmitting mechanism connecting said members, of a plurality of fluid actuated means for operating said mechanism to vary the speed ratio between said members; means for supplying fluid; means responsive to the speed of one of said members for distributing the fluid to said operating means in various combinations; and means for automatically reducing the pressure of the fluid supplied to said operating means in one of said combinations.

19. The combination with a driving member, a driven member, and a variable-speed power-transmitting mechanism connecting said members, of a plurality of fluid actuated means for operating said mechanism to vary the speed ratio between said members; means for supplying fluid; means responsive to the speed of one of said members for distributing the fluid to said operating means in various combinations; means for controlling said distributing means, at will, to vary said combinations; and means for automatically relieving the pressure of the fluid supplied to said operating means in certain of said combinations.

In testimony whereof we have signed our names to this specification.

FRED F. SMALL.
CARL E. NAGEL.